United States Patent [19]
Malvern

[11] Patent Number: 5,465,150
[45] Date of Patent: Nov. 7, 1995

[54] OPTICAL FIBER GYROSCOPE SENSING COIL HAVING A REDUCED SENSITIVITY TO TEMPERATURE VARIATIONS OCCURRING THEREIN

[75] Inventor: Alan R. Malvern, Plymouth, Great Britain

[73] Assignee: British Aerospace PLC, London, England

[21] Appl. No.: 214,639

[22] Filed: Mar. 18, 1994

[30] Foreign Application Priority Data

Mar. 19, 1993 [GB] United Kingdom ............... 9305688

[51] Int. Cl.[6] .............................................. G01C 19/72
[52] U.S. Cl. ................................................. 356/350
[58] Field of Search ................................. 356/350

[56] References Cited

U.S. PATENT DOCUMENTS 4,856,900  8/1989  Ivancevic .

FOREIGN PATENT DOCUMENTS 0212712  8/1990  Japan ................................. 356/350

Primary Examiner—Samuel A. Turner
Attorney, Agent, or Firm—Cushman, Darby & Cushman

[57] ABSTRACT

A fiber optic gyroscope sensing coil having two parts one wound clockwise and the other wound counter-clockwise from a central point on a spool towards ends thereof and back towards the center before crossing over each other and being wound out and back a plurality of times. Such an arrangement has the advantage of eliminating the temperature sensitivity of such coils and reducing microbending of the fibers thereby producing a more accurate coil for a fiber optic gyroscope. Preferably the outermost layer of fiber is a single layer.

4 Claims, 6 Drawing Sheets

OPTICAL FIBER GYROSCOPE SENSING COIL HAVING A REDUCED SENSITIVITY TO TEMPERATURE VARIATIONS OCCURRING THEREIN

BACKGROUND OF THE INVENTION

1. Field of the Invention

The present invention relates to a fiber optic gyroscope sensing coil and to a method of manufacture same. More particularly, this invention pertains to improved fiber optic sensing coils and a method for their formation.

2. Description of the Art

Fiber optic gyroscopes comprise an interferometer which includes a light source, beam splitter and detector, and a fiber optic sensing coil. Light from the light source is split by the beam splitter and applied to the ends of the sensing coil. The interferometer and associated electronics process the phase relationship between the two interfering, counter-propagating beams of light that emerge from opposite ends of the coil. The difference between the phase shifts experienced by the two beams provides a measure of the rate of rotation of the platform to which the instrument is fixed.

One of the problems associated with presently known fiber optic gyroscope sensing coils is their temperature sensitivity. It is therefore common practice to wind fiber onto a coil such that the fiber is laid up in alternate layers, supplied from alternate windings of fiber. Such an arrangement is illustrated in FIG. 1 and helps to reduce the effect of any radial temperature difference experienced by clockwise and counter-clockwise light beams. Any temperature change experienced in the path length will change the time it takes for the light to travel around the coil and will have an adverse effect on the performance of a gyroscope employing such coils. The above mentioned arrangement, whilst reducing the temperature sensitivity is unable to average out temperature effects on fiber lengths shorter than the double layer as this fiber comes from only one of the two spools. In addition to the above, any axial temperature variation dT/dx along the axis X of the sensing coil will also have a significant effect on the performance of the gyro as such temperature variations cannot be compensated for.

Referring to FIG. 1 it will be appreciated that the fiber at the end of each layer will have to undergo a double layer Jump to the next layer before it is again wound around the coil. Such Jumping can result in microbending with the associated, and undesirable, consequence of polarization cross coupling. Such cross coupling is known to be one of the key error sources of the gyro.

U.S. Pat. No. 4,856,900 discloses a quadrupole-wound sensing coil for a fiber optic gyroscope in which alternate double layers of fiber are wound onto a coil and microbends are reduced by winding the fiber through three concentric turns adjacent distinct home flanges whilst the alternate double layer is being wound. A new alternate double layer is then easily started without bending the fiber, thereby avoiding the undesirable effects of microbends.

The above mentioned approach, whilst reducing the problems associated with microbends, does little to reduce the problems associated with axial and radial temperature sensitivity. Indeed, the use of such double layers of fiber would exacerbate the radial temperature sensitivity problem.

SUMMARY OF THE INVENTION

It is an object of the present invention to provide a fiber optic gyroscope sensing coil and a method of manufacture thereof which reduce and possibly eliminate the above mentioned problems.

Accordingly, the present invention provides a fiber optic coil wound from a pair of supplies comprising a winding of fiber on a spool, said fiber extending in opposite directions from a mid point on said spool one going clockwise and the other counter clockwise towards ends of said spool and back to the center thereof to form a double layer, said fibers being crossed at the center of the spool and being wound in opposite directions to each other at least once again, one going clockwise and other counter-clockwise towards said ends and back to the center of the spool to form at least one further double layer.

It will be appreciated that by winding the fiber in the above mentioned way, each point on each half of the coil experiences the same temperature as it is the same distance from the center of the spool. Such an arrangement thereby reduces and possibly eliminates both the axial and radial temperature sensitivity of a fiber optic gyroscope sensing coil.

In addition to the above mentioned advantage, the present arrangement avoids undesirable microbending by crossing the fibers over at the center of the spool where a gradual change in fiber position is possible.

According to another aspect of the present invention, there is provided a method of winding an optical fiber from first and second supplies onto a sensor spool comprising the steps of:

(a) locating a point on said fiber intermediate the ends thereof: then (b) positioning said point of said fiber at a mid point on said spool; then (c) winding said fiber onto said spool by winding the fiber from each supply in opposite directions with one going clockwise and the other counter-clockwise towards ends of said spool and back to the center thereof, thereby to form a first double layer; then (d) crossing over said supplies: then (e) repeating step c and d above to give an even number of double layers, thereby to produce a sensor coil for a fiber optic gyroscope.

Preferably the point on the fiber intermediate the ends thereof is the mid point thereof.

Conveniently, each supply is a spool of fiber.

Advantageously, the method includes winding a single layer of fiber as the outermost layer of the coil.

BRIEF DESCRIPTION OF THE DRAWINGS

The present invention will now be more particularly described by way of example only with reference to the accompanying drawings in which.

DETAILED DESCRIPTION OF THE PRESENTLY PREFERRED EMBODIMENT

Figure 3:
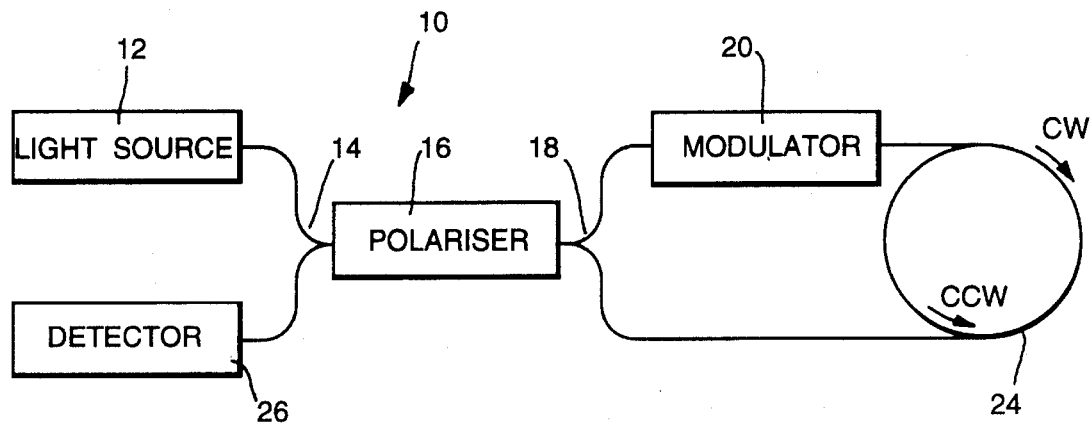
FIG. 3 is a schematic representation of a fiber optic gyro having a fiber coil wound in accordance with the present invention.

Referring initially to FIG. 3, a fiber optic gyroscope generally indicated at 10 comprises a light source 12 which supplies light via a Y branch 14 to a polarizer 16. The polarized light is supplied to a further Y branch 18 where it is split into two components (clockwise and counter-clockwise) which, after modulation by modulator 20 propagate around a multi-turn coil of optical fiber 24. After leaving the coil, the C. W. and C. C. W. components are recombined by Y branch 18, and passed via the polarizer 16 and Y branch 14 to a detector 26. A microprocessor (not shown) controls the various constituent parts of the gyroscope 10, processes the output of the detector in a known manner, and outputs data representing the rate of rotation applied to the coil.

Figure 1:
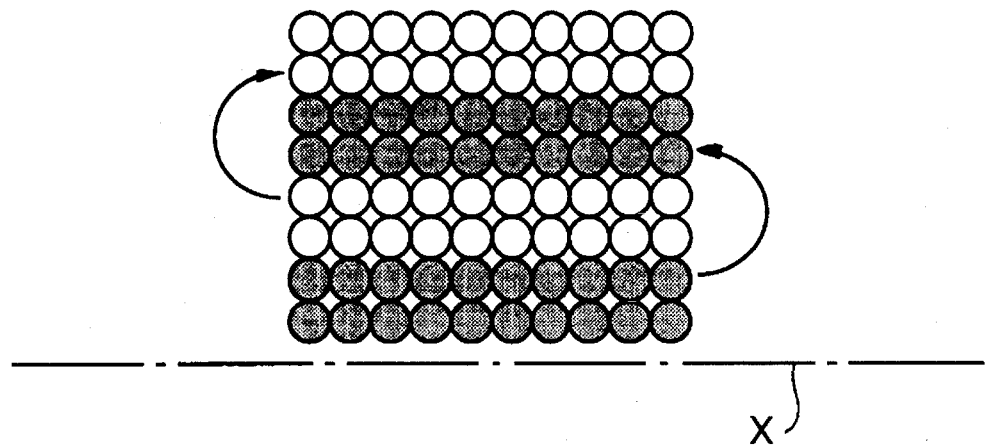
FIG. 1 is a part cross sectional view of a first, well known, coil winding.
Figure 2:
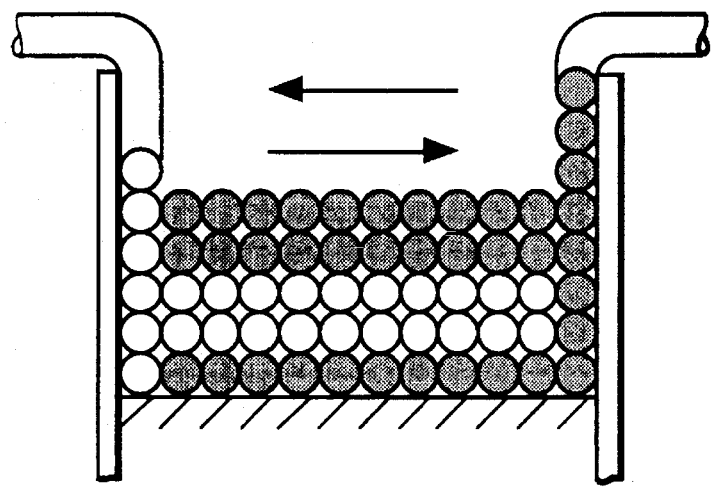
FIG. 2 is a part cross sectional view of a second conventional coil windings.

Referring again to FIGS. 1 and 2, it will be appreciated that different parts of the wound fiber will experience different temperatures depending on their position. Fiber lengths on the extremities of the coil will experience higher temperatures than fiber lengths buried within the coil. The alternate layer technique illustrated in FIGS. 1 and 2 will result in e mismatch in temperatures being experienced by the C. W. and C. C. W. components at any given moment in time. Clearly, the temperature experienced will vary with time and this will cause the optical path length experienced by the two components to vary. Variations in the path length will result in one component taking longer to pass around the coil than the other, thus giving a false indication of rotation and hence causing significant gyro errors.

Figure 4:
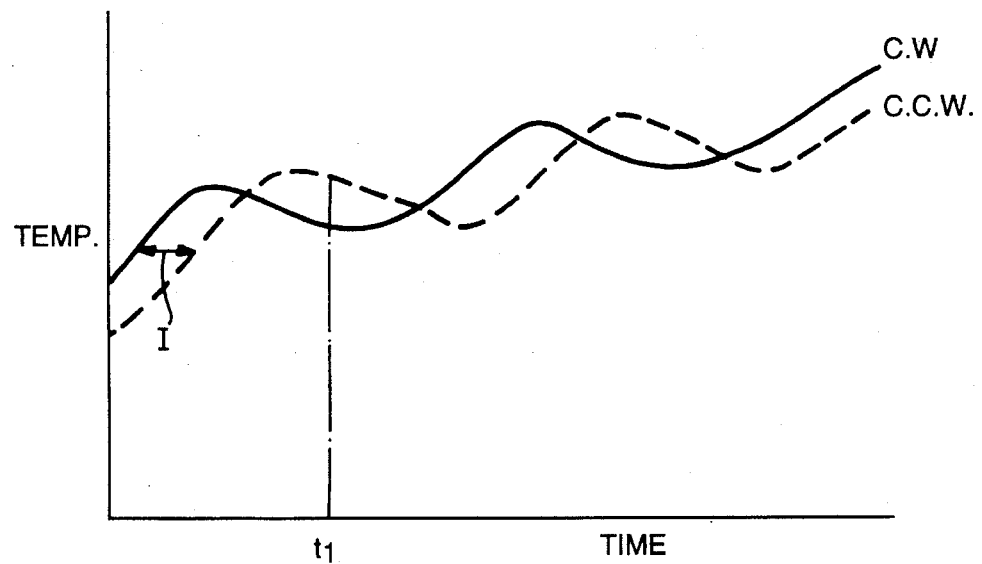
FIG. 4 is a graph illustrating the possible temperature variation in a sensing coil as wound in FIGS. 1 or 2.
Figure 5:
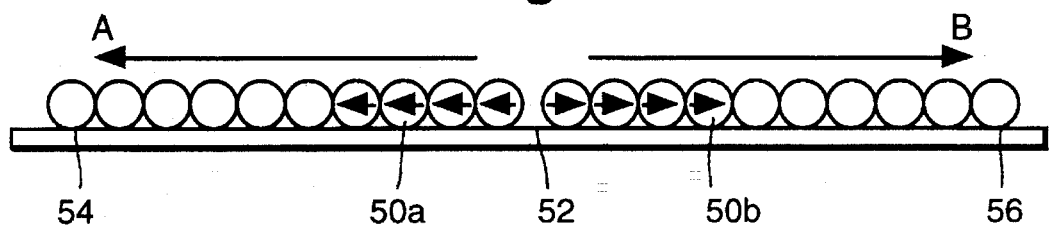
FIGS. 5 to 8 are partial cross-sectional views of a sensing coil wound in accordance with the present invention and illustrate the various production stages thereof.

FIG. 4 illustrates a temperature/time variation for C. W. and C. C. W. components in a conventional fiber optic sensing coil.

The present invention overcomes the above mentioned problem and reduces the problem associated with microbending by winding the fiber optic cable onto the spool in a particular manner, best seen in FIGS. 5 to 8.

Figure 6:
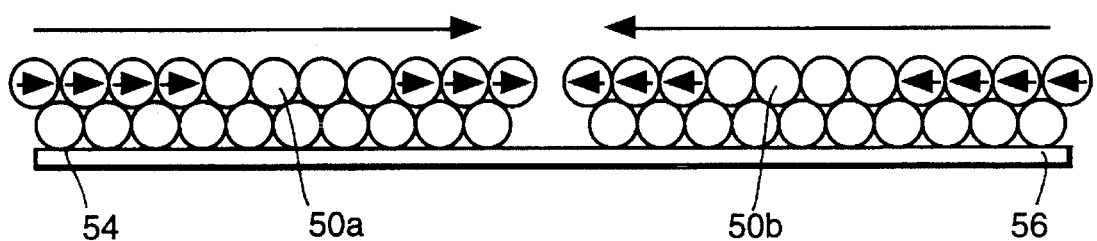
Figure 7:
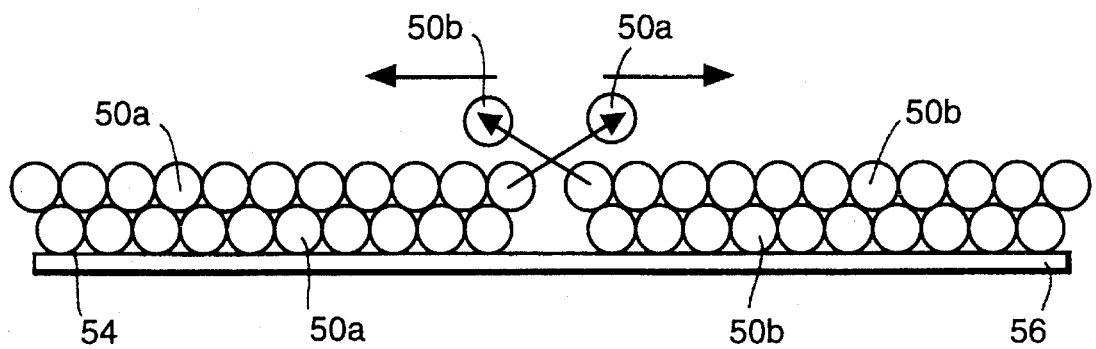
Figure 8:
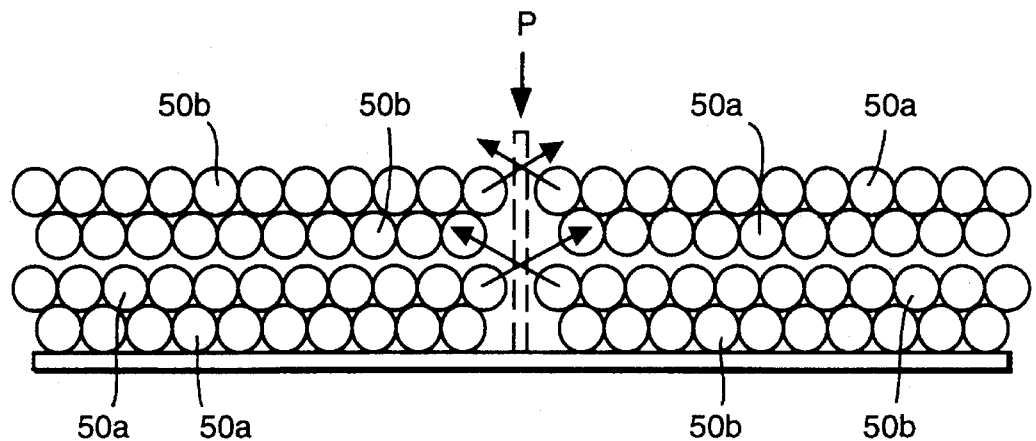
Figure 9:
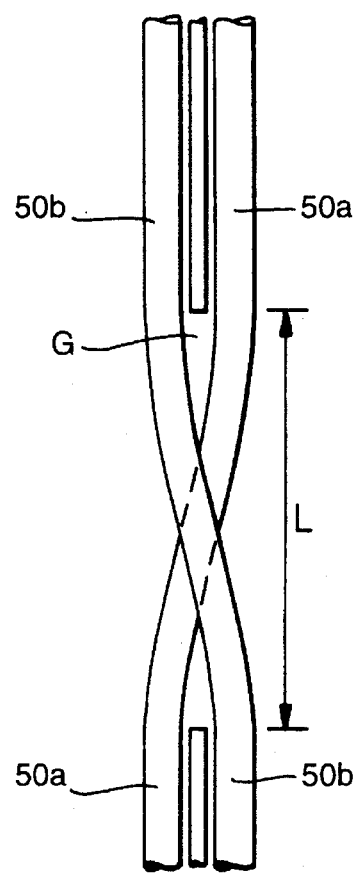
FIG. 9 is a plan view of the coil taken in the direction of arrow P in FIG. 8.
Figure 10:
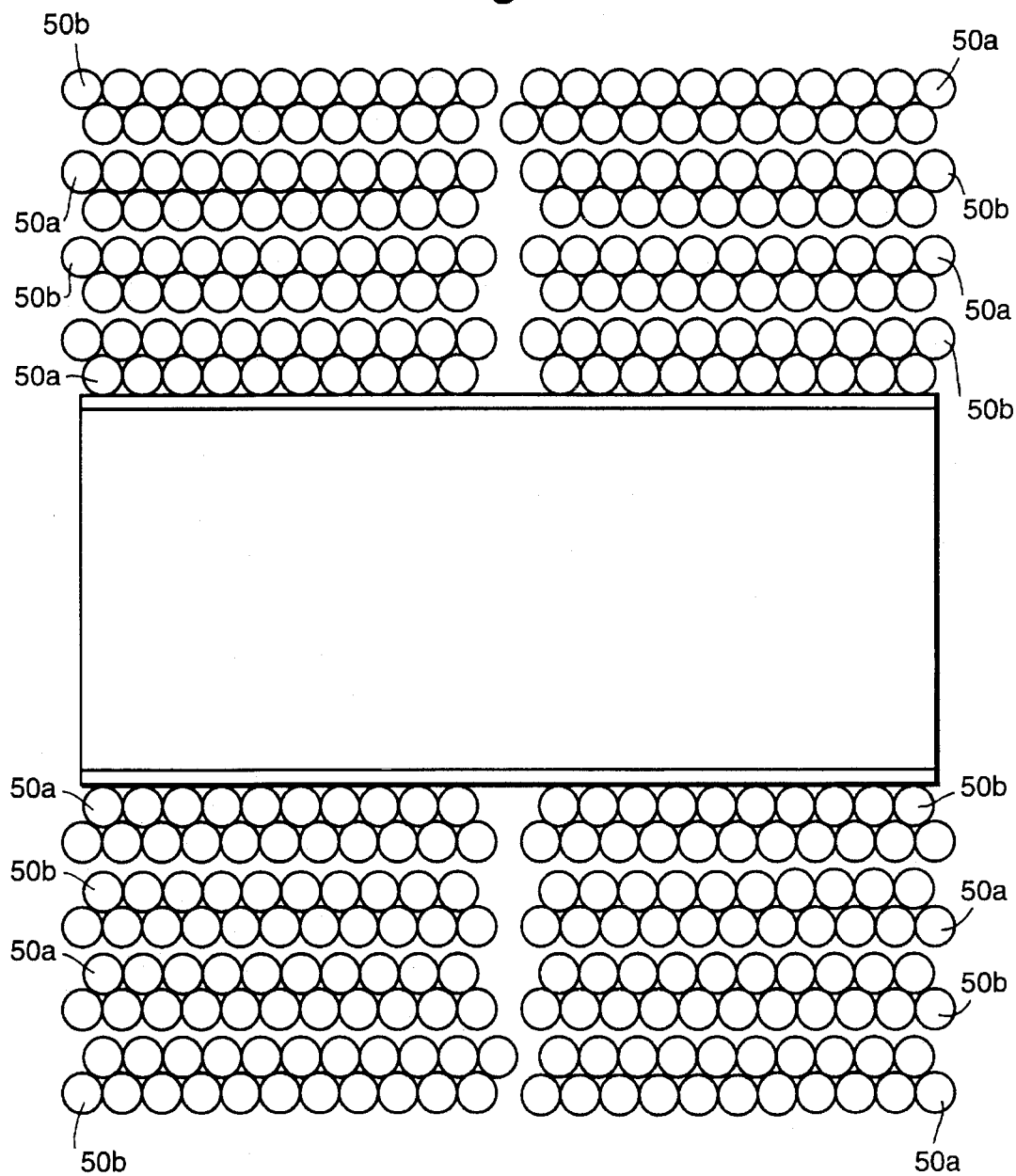
FIG. 10 is a cross-sectional view of a finished sensing coil wound in accordance with the present invention.

During production, the fiber 50 is divided into two parts 50a, 50b with each part being wound onto a different feed spool (not shown) and coiling is started from the middle 52 of the fiber. To coil the fiber, both feed spools are rotated from the center of the coil 24 but in opposite directions A and B with one direction being clockwise and the other direction being counter-clockwise towards the ends 54, 56 (FIG. 5) and back to the center (FIG. 6). The feed spools (not shown) are then crossed over (FIG. 7) at a suitably large junction in support wall 51 (FIG. 9) and winding is restarted to create another double layer by winding out towards the ends 54, 56 and back again towards the center 52. Once the fibers 50a, 50b reach the center they are once again crossed over and the winding step is repeated until the coil 24 is fully wound as shown in FIG. 10.

It will be appreciated that by winding the fiber in opposite directions away from the center of the coil and then back towards the center, corresponding clockwise and counter clockwise portions will always be the same distance from the center of the coil and will, therefore, always experience the same temperature as each other. Axial temperature variations dT/dx will therefore be eliminated thereby increasing the accuracy of the sensor. The effects of a radial temperature variation is eliminated by crossing the clockwise and counter clockwise fibers over at the middle of the coil, thereby ensuring that corresponding clockwise and counter clockwise fiber portions are always at the same radial position.

In addition to the above, it will be appreciated from FIGS. 5 to 9 that the crossing over of the fibers 50 occurs in the middle of the coil and a gentle transition is possible between layers. It is therefore less likely that microbending, with its associated problems of polarization cross coupling, will occur. Such cross coupling is, as discussed above, known to be one of the key error sources of such a gyro.

Figure 11:
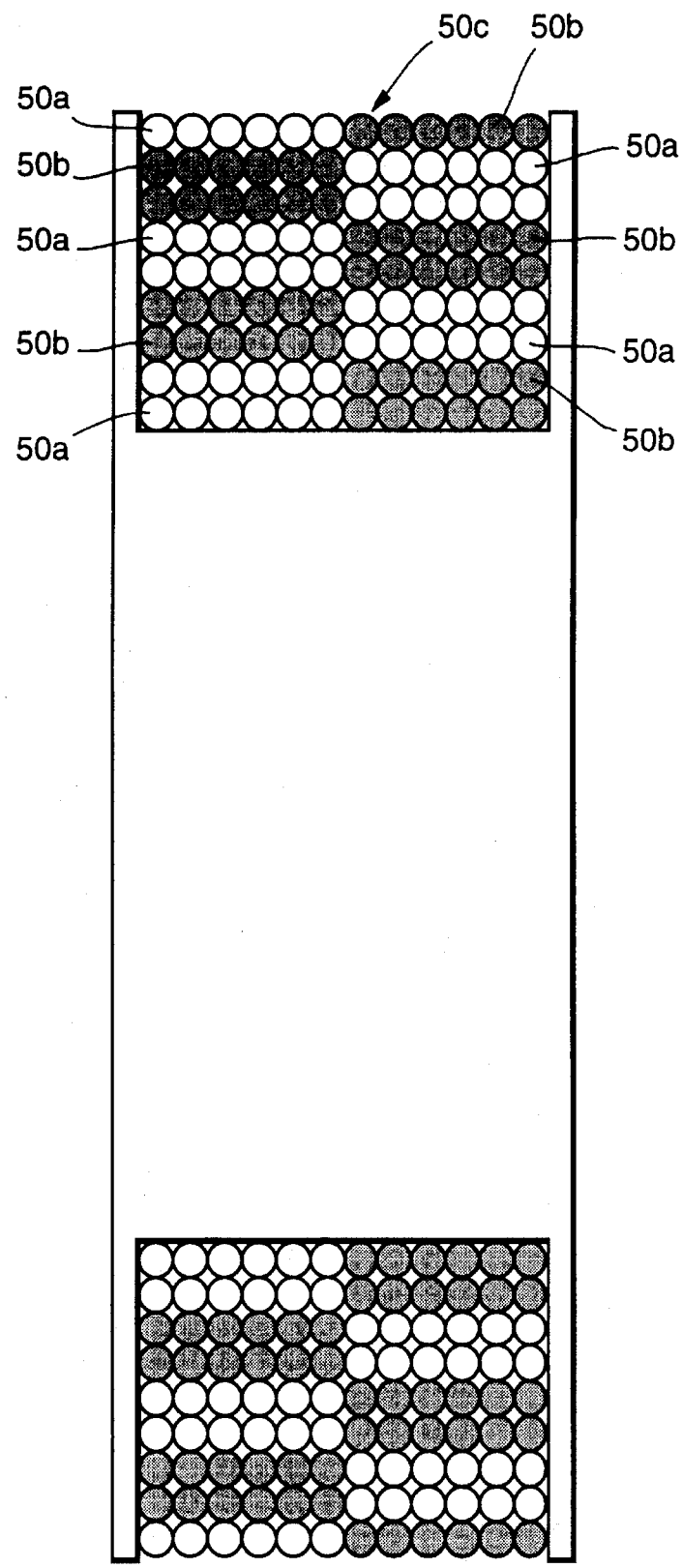
FIG. 11 is a cross-sectional view of a further embodiment of the invention of a modified coil of FIG. 10.

In the modified embodiment shown in FIG. 11, a further single layer 50c, made up of CW and CCW components 50a, 50b is provided to form the outermost layer of the coil. Such a modified coil has reduced vulnerability to Z-axis temperature transients providing an order of magnitude improvement in the bias temperature performance of the coil, compared to that of FIG. 10 which has an even number of double layers of fiber.

I claim:

1. A fiber optic coil wound from a pair of optical fiber supplies comprising:

a winding of fiber on a spool, said fiber extending in opposite directions from a mid point on said spool, one of said opposite directions being clockwise and another of said opposite directions being counter clockwise, towards ends of said spool and back to said center thereof to form a first double layer, said fibers being crossed at said center of said spool and being wound in directions opposite to each other at least once again, one of said opposite directions being clockwise and another of said opposite directions being counter-clockwise towards said ends of said spool and back to said center thereof to form at least a second double layer, said winding of fiber including a single layer of said fiber provided on an outermost layer of said coil.

2. A method of winding an optical fiber from first and second optical fiber supplies onto a sensor spool comprising the steps of:

(a) locating a point on said fiber between ends thereof; then (b) positioning said point of said fiber at a mid point on said spool;

(c) winding said fiber onto said spool by winding fiber from each optical fiber supply in opposite directions with one of said opposite directions being clockwise and another of said opposite directions being counter-clockwise towards ends of said spool and back to a center thereof to form a first double layer;

(d) crossing over said supplies;

(e) repeating step c and d to provide an even number of double layers on said sensor Spool, thereby producing a sensor coil for a fiber optic gyroscope; and (f) winding a single layer of fiber as an outermost layer of said coil.

3. A method of winding according to claim 2, wherein said point on said fiber between said ends thereof is the mid point thereof.

4. A method of winding according to one of claim 2 or claim 3, wherein each optical fiber supply is a spool of optical fiber.

* * * * *